C. O. LUCE.
Hand-Seeder
No. 18,344. Patented Oct. 6. 1857.
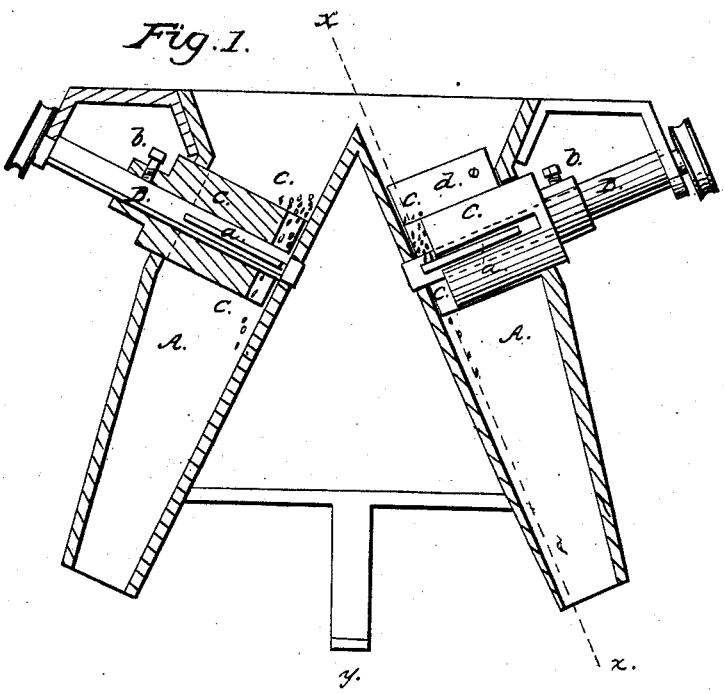
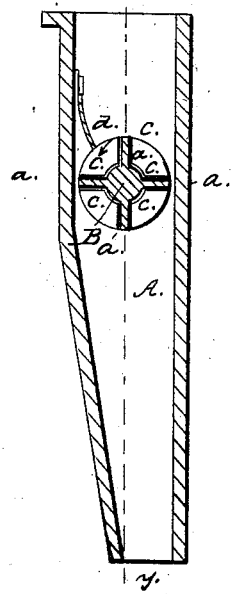

UNITED STATES PATENT OFFICE.

C. O. LUCE, OF BRANDON, VERMONT.

IMPROVEMENT IN SEED-PLANTERS.

Specification forming part of Letters Patent No. 18,344, dated October 6, 1857.

*To all whom it may concern:*

Be it known that I, C. O. LUCE, of Brandon, in the county of Rutland and State of Vermont, have invented a new and useful Improvement in Seed-Planters; and I do hereby declare that the following is a full, clear, and exact description of the same, reference being had to the annexed drawings, making a part of this specification, in which—

Figure 1 is a vertical section of my improvement, taken in the line $y\ y$, Fig. 2. Fig. 2 is also a vertical section of the same, taken in the line $x\ x$, Fig. 1.

Similar letters of reference indicate corresponding parts in the two figures.

This invention relates to an improved means for distributing the seed or measuring and discharging the same from the hoppers or seed-boxes.

The object of the invention is to obtain a simple and efficient regulating device, whereby a greater or less quantity of seed may be distributed or sown on a given quantity of ground, as may be desired, the invention being mainly applicable to a seed-planter formerly patented by me June 19, 1856, and in which the seed is sown broadcast by centrifugal force generated by the rotation of horizontal wheels, into which the seed is discharged in measured quantities from the hopper or seed box.

To enable those skilled in the art to fully understand and construct my invention, I will proceed to describe it.

A A represent two conveying-tubes, the upper ends of which communicate with the lower part of the hopper or seed-box, and the lower ends are placed directly over the wheels. Neither the hopper nor wheels are shown, as they do not form a part of the invention, which may be applicable to other seed-planters. The upper ends of the tubes A A are attached or connected as shown in Fig. 1, and a shaft, B, passes laterally into each tube. Each shaft—that is, the portion of them within the tubes—has four radial plates, $a$, attached to them at equal distances apart, as shown in Fig. 2, the plates extending entirely across the tubes, as shown in Fig. 1.

On the shafts B B cylinders C C are placed, one on each. These cylinders are placed loosely on the shafts, and may be secured at any desired point therein by set-screws $b$. These cylinders are also slotted longitudinally, so that they may receive the plates $a$, as shown clearly in Fig. 1. The cylinders C are allowed to pass into the tubes A A, and from the above description of parts it will be seen that the radial plates $a$ form chambers $c$, which, as the shafts B are rotated, discharge the seed into the lower parts of the tubes A A, the chambers serving as measures and the seed falling therein by its own gravity and discharged therefrom by the same cause. It will also be seen that by adjusting or sliding the cylinders C C on the shafts B the capacity of the seed-chambers $c$ may be increased or diminished, as occasion may require, and consequently a greater or less quantity of seed may be sown on a given space or area of ground, as may be desired.

The lower end of a spring-plate, $d$, bears upon the periphery of each cylinder C and the edges of their plates $a$, and serve as cut-offs, preventing the seed being crushed between the sides of the tubes A A and the edges of the plates $a$ as the shafts and cylinders rotate. The shafts B may be rotated in any proper way from the driving-wheels of the machine.

I am aware rotating cylinders provided with seed cells or chambers have been previously used and form well-known devices for distributing seed; but I am not aware that parts have been arranged, as herein described, whereby the capacity of the seed cells or chambers can be varied with such facility. I therefore do not claim a rotating cylinder or shaft provided with seed cells or chambers; but,

Having thus described my invention, what I claim as new, and desire to secure by Letters Patent, is—

The rotating shafts B, provided with the radial plates $a$ and the adjustable or sliding cylinders C, in connection with the elastic or spring cut-offs $d$, the above parts being combined and arranged specifically as and for the purpose set forth.

C. O. LUCE.

Witnesses:
R. V. MARSH,
H. S. M. COLLUM.